United States Patent
Lin et al.

(10) Patent No.: US 12,452,920 B2
(45) Date of Patent: Oct. 21, 2025

(54) DATA TRANSMISSION METHOD AND APPARATUS, AND STORAGE MEDIUM

(71) Applicant: ZTE CORPORATION, Shenzhen (CN)

(72) Inventors: Wei Lin, Shenzhen (CN); Yajun Zhao, Shenzhen (CN); Xincai Li, Shenzhen (CN); Ling Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 599 days.

(21) Appl. No.: 17/763,500

(22) PCT Filed: Sep. 27, 2020

(86) PCT No.: PCT/CN2020/118143
§ 371 (c)(1),
(2) Date: Mar. 24, 2022

(87) PCT Pub. No.: WO2021/057976
PCT Pub. Date: Apr. 1, 2021

(65) Prior Publication Data
US 2022/0338259 A1     Oct. 20, 2022

(30) Foreign Application Priority Data
Sep. 26, 2019   (CN) .......................... 201910919168.5

(51) Int. Cl.
*H04W 16/14*     (2009.01)
*H04L 1/00*       (2006.01)
(Continued)

(52) U.S. Cl.
CPC ....... *H04W 74/0816* (2013.01); *H04L 1/0068* (2013.01); *H04W 72/0446* (2013.01); *H04W 72/0453* (2013.01); *H04W 74/0866* (2013.01)

(58) Field of Classification Search
CPC ............. H04W 72/0446; H04W 16/14; H04W 74/0866; H04W 72/0453; H04W 74/0816;
(Continued)

(56) References Cited

U.S. PATENT DOCUMENTS

2016/0057770 A1    2/2016  Yerramalli et al.
2019/0053042 A1*   2/2019  Phuyal .................... H04W 8/24
(Continued)

FOREIGN PATENT DOCUMENTS

CN    105682239 A    6/2016
CN    106454881 A    2/2017
(Continued)

OTHER PUBLICATIONS

Extended European Search Report for Application No. 20870396.7, dated Sep. 28, 2023, 8 pages.
(Continued)

*Primary Examiner* — Anez C Ebrahim
(74) *Attorney, Agent, or Firm* — Morgan, Lewis & Bockius LLP

(57) ABSTRACT

Provided are a data transmission method and apparatus, and a storage medium. The data transmission method includes: performing, by a first communication terminal, a clear channel assessment on a target resource, where the target resource is a target time domain resource corresponding to a part of second data transmission suspended or punctured by a second communication terminal, and the first communication terminal and the second communication terminal satisfy a transmission multiplexing condition; and when a channel is determined to be in an idle state, transmitting, by the first communication terminal, first data on the channel.

16 Claims, 5 Drawing Sheets

(51) Int. Cl.
*H04W 72/0446* (2023.01)
*H04W 72/0453* (2023.01)
*H04W 74/08* (2009.01)
*H04W 74/0816* (2024.01)

(58) Field of Classification Search
CPC .. H04W 76/14; H04W 74/0808; H04L 1/0068
See application file for complete search history.

(56) References Cited

U.S. PATENT DOCUMENTS

| | | | |
|---|---|---|---|
| 2019/0289616 | A1 | 9/2019 | Hampel et al. |
| 2022/0167397 | A1* | 5/2022 | Thangarasa ........... H04W 74/08 |

FOREIGN PATENT DOCUMENTS

| | | | |
|---|---|---|---|
| CN | 107040938 | A | 8/2017 |
| CN | 107734682 | A | 2/2018 |
| CN | 109150475 | A | 1/2019 |
| CN | 109618362 | A | 4/2019 |
| CN | 109906659 | A | 6/2019 |
| CN | 110611959 | A | 12/2019 |
| EP | 3500011 | A1 | 6/2019 |
| WO | WO 2017/132829 | A1 | 8/2017 |
| WO | WO 2018/152985 | A1 | 8/2018 |
| WO | WO-2019058022 | A1 | 3/2019 |

OTHER PUBLICATIONS

International Search Report for Application No. PCT/CN2020/118143, dated Dec. 30, 2020, 4 pages including English translation.
Nokia et al., "Channel access and co-existence for NR-U operation", *3GPP TSG RAN WG1 Meeting #97 R1-1906646*, May 17, 2019 (May 17, 2019), entire document.
First Search Report in Chinese Application No. 2019109191685, dated Oct. 22, 2024, 8 pages, including translation.
First Office Action in Chinese Application No. 2019109191685, dated Oct. 24, 2024, 23. pages, including translation.
First Office Action in Korean Application No. 10-2022-7013311, dated Feb. 17, 2025, 4 pages, including translation.
3GPP Technical Specification Group Radio Access Network, "Study on NR-based Access to Unlicensed Spectrum (Release 16)", 3GPP TR 38.889 v1.0.0 (Nov. 2018) Technical Report.
Second Office Action in Chinese Application No. 201910919168.5, dated Apr. 26, 2025, 35 pages, including translation.
Supplemental Search Report in Chinese Application No. 2019109191685, dated Apr. 24, 2025, 6 pages, including translation.

* cited by examiner

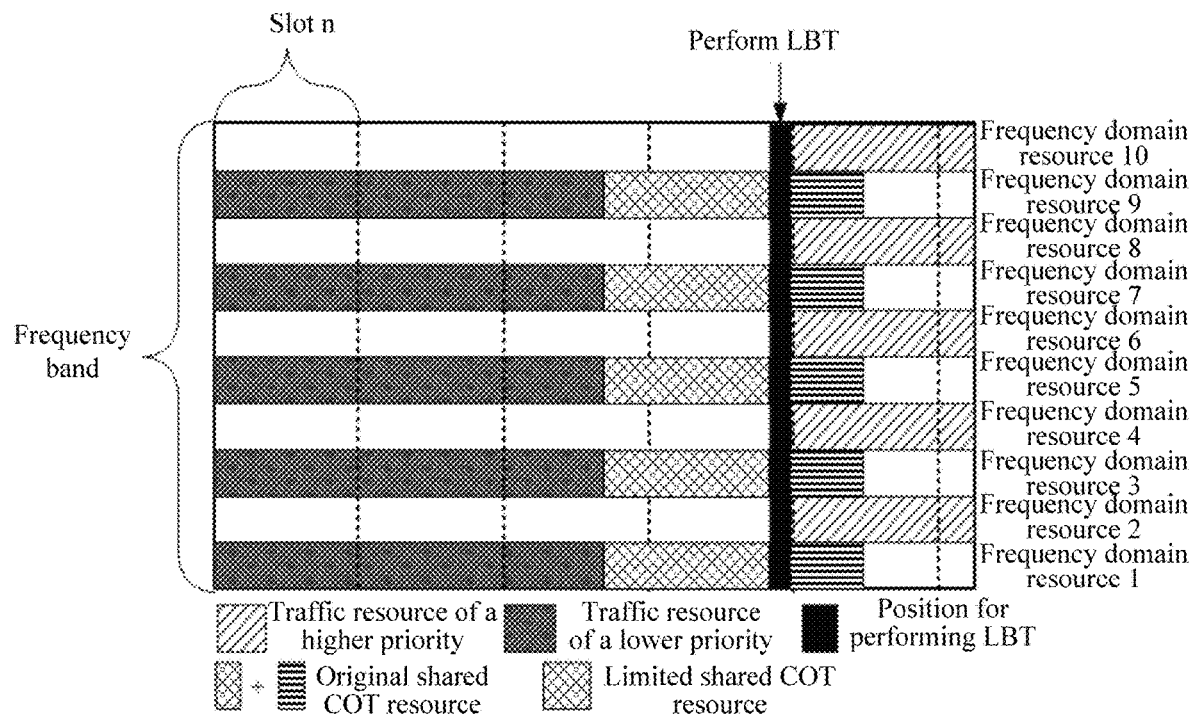

FIG. 3C

```
┌─────────────────────────────────────────────────────────────┐
│ A second communication terminal suspends or punctures a part of │─ 401
│               the second data transmission                   │
└─────────────────────────────────────────────────────────────┘
```

FIG. 4

```
┌─────────────────────────────────────────────────────────────┐
│ A communication node sends first indication information to a │─ 501
│              second communication terminal                   │
└─────────────────────────────────────────────────────────────┘
```

FIG. 5

DATA TRANSMISSION METHOD AND APPARATUS, AND STORAGE MEDIUM

CROSS-REFERENCES TO RELATED APPLICATIONS

This is a National Stage Application, filed under 35 U.S.C. 371, of International Patent Application No. PCT/CN2020/118143, filed on Sep. 27, 2020, which is based on and claims priority to Chinese Patent Application No. 201910919168.5 filed with the China National Intellectual Property Administration (CNIPA) on Sep. 26, 2019, the disclosure of which is incorporated herein by reference in its entirety.

TECHNICAL FIELD

The present application relates to the field of wireless communication networks and, in particular, to a data transmission method and apparatus and a storage medium.

BACKGROUND

Standard formulation in the first phase of the 5th-generation mobile communication technology (5G, also known as New Radio (NR)) has been completed. From the perspective of standard formulation and technical development trends, a 5G system is dedicated to researches on a higher rate, massive links, ultra-low latency, higher reliability, energy efficiency improvement by a factor of 100 and other technical indicators to support new demand changes. An NR-based access to unlicensed spectrum (NR-U) technology has great application prospects in the Internet of Things, factory automation and other aspects. However, the NR-U still faces many problems to be solved.

The use of an unlicensed spectrum needs to follow certain regulatory policies. For example, before using an unlicensed carrier to send data, a device has to perform listen-before-talk (LBT, also known as a clear channel assessment (CCA)). Only a device successfully performing LBT can send data on an unlicensed carrier. In the NR-U, for all traffic of different priorities, LBT needs to be performed before data is sent. To satisfy the indicator demands of traffic of a higher priority, the traffic of a higher priority may need to preempt the resources of traffic of a lower priority under different conditions for the purpose of sending data of the traffic of a higher priority. In the NR-U, there is no feasible scheme for multiplexing of the traffic of different priorities and for performing LBT in multiplexing.

SUMMARY

The present application provides a data transmission method and apparatus and a storage medium so that the transmission multiplexing of traffic of different priorities can be implemented.

Embodiments of the present application provide a data transmission method. The method includes the following.

A first communication terminal performs a clear channel assessment on a target resource, where the target resource is a target time domain resource corresponding to a part of second data transmission suspended or punctured by a second communication terminal, and the first communication terminal and the second communication terminal satisfy a transmission multiplexing condition.

When a channel is determined to be in an idle state, the first communication terminal transmits first data on the channel.

Embodiments of the present application provide a data transmission method. The method includes the following.

A second communication terminal suspends or punctures the part of the second data transmission, where a first communication terminal uses a target time domain resource corresponding to the a part of second data transmission suspended or punctured by the second data transmission as a target resource and performs a clear channel assessment on the target resource, and the first communication terminal and the second communication terminal satisfy a transmission multiplexing condition.

Embodiments of the present application provide a data transmission method. The method includes the following.

A communication node sends first indication information to a second communication terminal, where the first indication information is used for indicating that the second communication terminal partially suspends second data transmission or partially punctures the second data transmission; a first communication terminal determines a target time domain resource corresponding to the part of the second data transmission suspended by the second communication terminal or the part of the second data transmission punctured by the second communication terminal as a target resource and performs a clear channel assessment on the target resource; and the first communication terminal and the second communication terminal satisfy a transmission multiplexing condition.

Embodiments of the present application provide a data transmission apparatus. The data transmission apparatus includes a processor. When executing a computer program, the processor is configured to implement the data transmission method according to any one of the preceding embodiments.

Embodiments of the present application provide a storage medium. The storage medium stores a computer program. When executed by a processor, the computer program causes the processor to implement any data transmission method in the embodiments of the present application.

The preceding embodiments and other nonreserved aspects of the present application and implementations thereof are described in more detail in the brief description of drawings, detailed description and claims.

BRIEF DESCRIPTION OF DRAWINGS

FIG. 3C is a diagram showing another time-frequency domain resources for data transmission by a first communication terminal and a second communication terminal in the embodiment of FIG. 2.

FIG. 4 is a flowchart of another data transmission method according to one embodiment.

FIG. 5 is a flowchart of another data transmission method according to one embodiment.

DETAILED DESCRIPTION

To illustrate the object, solutions and advantages of the present application clearer, embodiments of the present application are described hereinafter in detail in conjunction with the drawings. It is to be noted that if not in collision, embodiments of the present application and features therein may be combined with each other in any manner.

Figure 1:
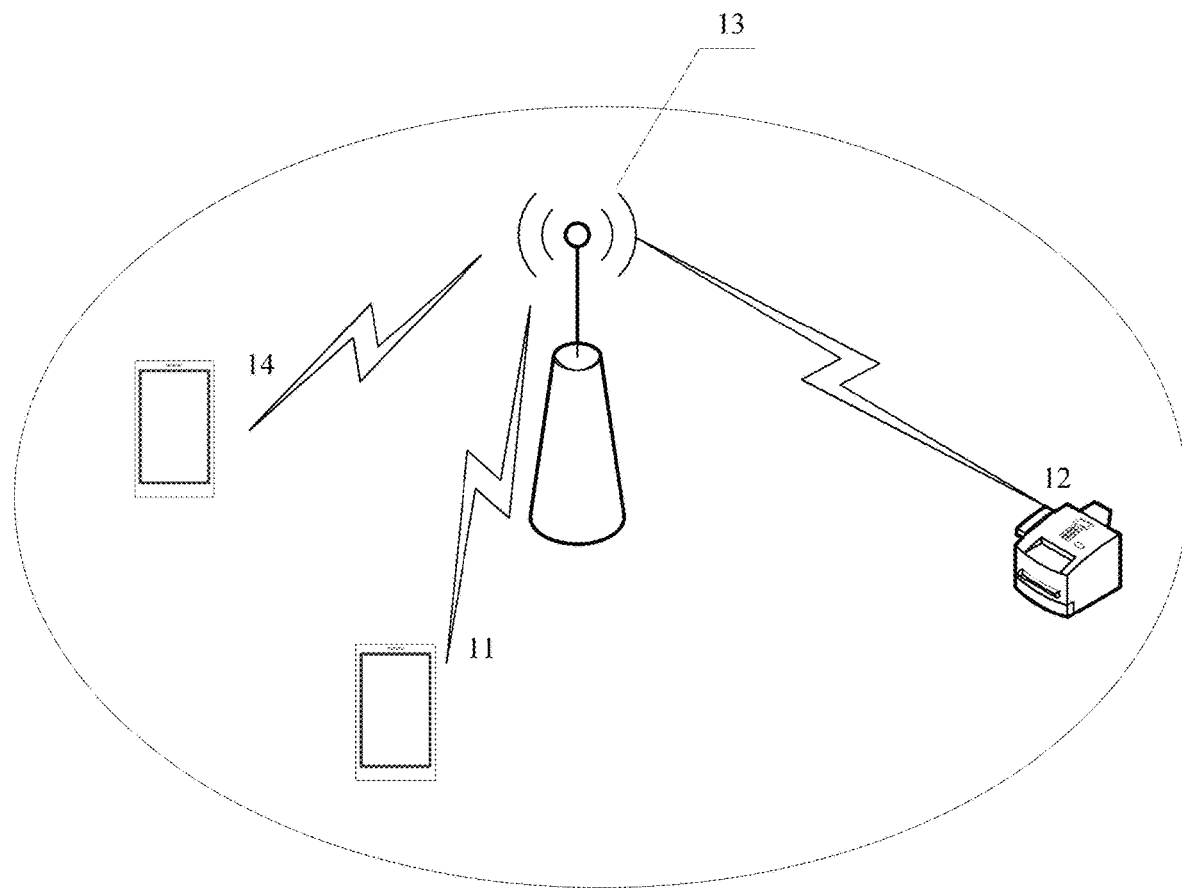
FIG. 1 is a diagram showing an application scenario of a data transmission method according to one embodiment.

A data transmission method according to the present application is applicable to a communication system composed of a first communication terminal and a second communication terminal. FIG. 1 is a diagram showing an application scenario of a data transmission method according to one embodiment. As shown in FIG. 1, a first communication terminal 11, a second communication terminal 12, a communication node 13 and a third communication terminal 14 constitute a communication system. The communication system may be a Global System for Mobile Communications (GSM) system, a General Packet Radio Service (GPRS) system, a code-division multiple access (CDMA) system, a CDMA2000 system, a wideband code-division multiple access (WCDMA) system, a Long Term Evolution (LTE) system, an LTE Advanced (LTE-A) system, a 5th-generation (5G) system or a Worldwide Interoperability for Microwave Access (WiMAX) system. In this communication system, the first communication terminal 11 and the second communication terminal 12 use an unlicensed carrier for data transmission. Optionally, first data transmitted by the first communication terminal has priority over second data transmitted by the second communication terminal. In this embodiment, the difference between traffic corresponding to the first data and traffic corresponding to the second data embodies in at least one of the following: the traffic corresponding to the first data requires a delay lower than a delay of the traffic corresponding to the second data; the traffic corresponding to the first data requires a reliability higher than a reliability of the traffic corresponding to the second data; or the traffic corresponding to the first data designates a priority higher than a designated priority of the traffic corresponding to the second data. In this embodiment, the traffic corresponding to the first data is called the traffic of a higher priority, and the traffic corresponding to the second data is called the traffic of a lower priority. Traffic of different priorities has different indicator demands. The traffic of a higher priority has higher demands on delay and reliability than the traffic of a lower priority. To satisfy the indicator demands of the traffic of a higher priority and ensure the performance of the traffic of a lower priority to the maximum, stipulations need to be made on the multiplexing of the traffic of different priorities. At present, a corresponding scheme for satisfying the multiplexing demand is not available in the unlicensed spectrum.

The present application provides a data transmission method so that in the case where the first communication terminal and the second communication terminal satisfy a transmission multiplexing condition, the transmission multiplexing of the first data of the first communication terminal and the second data of the second communication terminal can be implemented.

Figure 2:
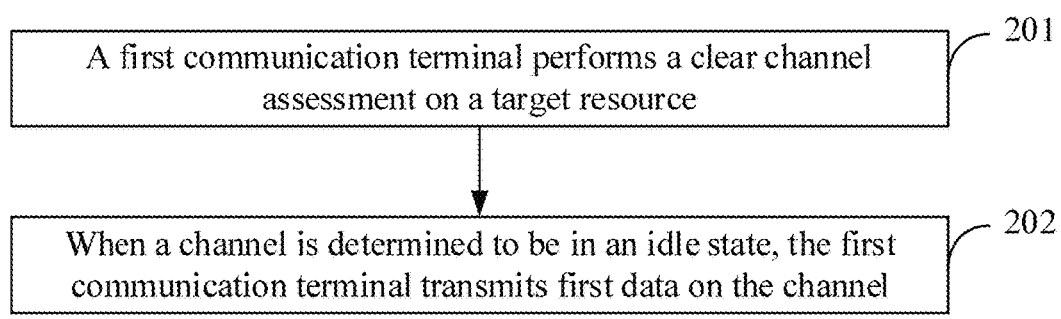
FIG. 2 is a flowchart of a data transmission method according to one embodiment.

FIG. 2 is a flowchart of a data transmission method according to one embodiment. As shown in FIG. 2, the method provided by this embodiment includes the following.

In S201, a first communication terminal performs a clear channel assessment on a target resource.

The target resource is a target time domain resource corresponding to a part of second data transmission suspended or punctured by the second communication terminal. The first communication terminal and the second communication terminal satisfy a transmission multiplexing condition.

In S202, when a channel is determined to be in an idle state, the first communication terminal transmits first data on the channel.

In this embodiment, the first communication terminal and the second communication terminal may be connective devices capable of providing voice and/or other traffic data for a user, handheld devices having a wireless connection function or other processing devices connected to a modem. The first communication terminal and the second communication terminal may be mobile terminals, for example, mobile phones (also known as "cellular" phones), and computers having a mobile terminal, for example, portable, pocket-sized, handheld, computer embedded or car-mounted mobile devices, which exchange language and/or data with a radio access network. The first communication terminal and the second communication terminal may be, for example, Personal Communications Service (PCS) phones, cordless phones, Session Initiation Protocol (SIP) phones, wireless local loop (WLL) stations and personal digital assistants (PDAs) and other devices. A first node may also be called a system, a subscriber unit, a subscriber station, a mobile station, a mobile, a remote station, a remote terminal, an access terminal, a user terminal, a user agent and a user equipment. This is not limited here.

In one embodiment, the transmission multiplexing condition includes that a time domain resource corresponding to channel occupancy time (COT) of the first communication terminal overlaps a time domain resource corresponding to COT of the second communication terminal.

Further, the transmission multiplexing condition may include that a frequency domain resource corresponding to the COT of the first communication terminal overlaps a frequency domain resource corresponding to the COT of the second communication terminal.

For ease of the following description, "a time domain resource corresponding to COT of the first communication terminal overlaps a time domain resource corresponding to COT of the second communication terminal, and a frequency domain resource corresponding to the COT of the first communication terminal overlaps a frequency domain resource corresponding to the COT of the second communication terminal" is defined as the first transmission multiplexing subcondition. "A time domain resource corresponding to COT of the first communication terminal overlaps a time domain resource corresponding to COT of the second communication terminal, and a frequency domain resource corresponding to the COT of the first communication terminal does not overlap a frequency domain resource corresponding to the COT of the second communication terminal" is defined as the second transmission multiplexing subcondition.

The first communication terminal and the second communication terminal transmit data in the same frequency band. The frequency band is the minimum frequency domain bandwidth unit in which a communication terminal/a communication node perform a clear channel assessment. The COT of the second communication terminal is the acquired COT after the second communication terminal performs the CCA. The COT of the first communication terminal is the COT pre-occupied by the first communication terminal.

Optionally, the first data transmitted by the first communication terminal has priority over the second data transmitted by the second communication terminal.

More specifically, the COT of the first communication terminal is the occupied COT resource when the first communication terminal uses a scheduling-based resource or a scheduling-free resource for transmission. The COT of the second communication terminal is the actually acquired COT after the second communication terminal performs the CCA. That is, the COT of the first communication terminal is the pre-occupied COT instead of the actually occupied COT, the first communication terminal only actually occupies the COT in the condition that the CCA detection is idle, and the COT of the second communication terminal is the actually acquired COT after the second communication terminal performs the CCA detection.

The target time domain resource in this embodiment is the resource corresponding to the a part of second data transmission suspended or punctured by the second communication terminal. In this embodiment, that the second communication terminal suspending or puncturing the part of the second data transmission is called that the second communication terminal reserving the target time domain resource for the first communication terminal. That is, the second communication terminal can reserve the target time domain resource by puncturing a part of time domain symbols or by suspending transmission on the part of symbols, and the second communication terminal does not send any data on the target time domain resource. A third communication terminal cannot perform a clear channel assessment on the target time domain resource. The third communication terminal is a communication node whose transmitted data has a priority not higher than a priority of the second data and whose occupied time-frequency domain resources overlap time-frequency domain resources corresponding to the COT of the second communication terminal.

In S201, when the first communication terminal needs to transmit the first data, the first communication terminal may perform the CCA on the target resource; or the first communication terminal may perform the CCA on the target resource within a preset time interval; or the first communication terminal may perform the CCA on the target resource under the indication of a communication node or other communication terminals. This is not limited in this embodiment.

In a first implementation, when the scheduling-based first communication terminal and the scheduling-based second communication terminal satisfy any one of the preceding transmission multiplexing subconditions, the first communication terminal sends a scheduling request (SR) after the arrival of the first data. After receiving the SR, a communication node sends downlink control information (DCI) scheduling uplink traffic to the first communication terminal. Optionally, the DCI may include a transmission resource allocated by the communication node for the first communication terminal.

The communication node in this embodiment may be a base transceiver station (BTS) in the GSM system or a BTS in the CDMA system, a NodeB (NB) in the WCDMA system, an Evolved NodeB (eNB), a relay station or an access point in the LTE or a station in the 5G system. This is not limited here.

Optionally, the communication node may send first indication information to the second communication terminal. The first indication information is used for indicating that the second communication terminal suspends or punctures the part of the second data transmission.

It is to be noted that the reservation of the target time domain resource for the first communication terminal by the second communication terminal under the indication of the communication node is a possible implementation, and other implementations may exist. For example, the second communication terminal reserves the target time domain resource under the indication of the first communication terminal, or the second communication terminal reserves the target time domain resource according to a preconfigured rule. This is not limited in this embodiment.

Optionally, the communication node may send second indication information to the second communication terminal. The second indication information is used for indicating that the second communication terminal cancels data transmission on the channel on which the first communication terminal transmits the first data. In other words, the second indication information is used for indicating that the second communication terminal cancels data transmission on the resource overlapping the time domain resource of the first communication terminal.

It is to be noted that in this implementation, the communication node may only send any one of the first indication information or the second indication information to the second communication terminal, or the communication node sends the first indication information and the second indication information to the second communication terminal as one indication information.

In this implementation, before the arrival of the transmission resource of the first communication terminal, the first communication terminal performs the CCA on the target time domain resource reserved by the second communication terminal to acquire a corresponding resource for transmitting the first data.

Further, in this implementation, when the scheduling-based first communication terminal and the scheduling-based second communication terminal satisfy the first transmission multiplexing subcondition, the first communication terminal sends the SR to the communication node after the arrival of the first data. After receiving the SR, the communication node sends the DCI scheduling uplink traffic to the first communication terminal and sends the first indication information and/or the second indication information to the second communication terminal. The second indication information is used for indicating that the second communication terminal cancels data transmission on the resource overlapping the time-frequency domain resources of the first communication terminal. Before the arrival of the transmission resource of the first communication terminal, the first communication terminal performs the CCA on the target time domain resource reserved by the second communication terminal to acquire the corresponding resource for transmitting the first data.

In a second implementation, when the scheduling-free first communication terminal and the scheduling-free second communication terminal satisfy any one of the preceding transmission multiplexing subconditions, the target resource is the target time domain resource corresponding to the a part of second data transmission suspended or punctured by the second communication terminal according to a time domain resource rule. The time domain resource rule includes that the second communication terminal suspends or punctures the part of the second data transmission before the arrival of the transmission resource of the first communication terminal; or when the first communication terminal needs to transmit data on the transmission resource, the second communication terminal suspends or punctures the part of the second data transmission before the arrival of the transmission resource of the first communication terminal.

It is to be noted that "the second communication terminal suspends or punctures the part of the second data transmission before the arrival of the transmission resource of the first communication terminal" indicates that the second communication terminal reserves the target time domain resource for the first communication terminal regardless of whether the first communication terminal uses its configured authorized resource.

"When the first communication terminal needs to transmit data on the transmission resource, the second communication terminal suspends or punctures the part of the second data transmission before the arrival of the transmission resource of the first communication terminal" indicates that the second communication terminal reserves the target time domain resource for the first communication terminal in the case where the first communication terminal uses its configured authorized resource.

In this implementation, the second communication terminal may also reserve the target time domain resource under the indication of the communication node.

In this implementation, the first communication terminal transmits the first data on the channel by use of the enhanced transmit power. Accordingly, the second communication terminal transmits the second data by use of the reduced transmit power or the original transmit power on the channel on which the first communication terminal transmits the first data.

In this implementation, the first communication terminal enhances the transmit power of the first data, and the second communication terminal maintains the transmit power of the second data or reduces the transmit power of the second data. Afterward, after the first communication terminal successfully performs the CCA on the target time domain resource, the first communication terminal transmits the first data by use of the enhanced transmit power, and the second communication terminal transmits the second data by use of the original transmit power or the reduced transmit power.

Further, in this implementation, when the scheduling-free first communication terminal and the scheduling-free second communication terminal satisfy the first transmission multiplexing subcondition, the first communication terminal enhances the transmit power of the first data, and the second communication terminal maintains the transmit power of the second data or reduces the transmit power of the second data. Before the first communication terminal sends data, the second communication terminal reserves the target time domain resource for performing the CCA by the first communication terminal.

In a third implementation, when the first communication terminal and the second communication terminal satisfy the second transmission multiplexing subcondition, the transmission multiplexing of the first data and the second data is implemented using the following two schemes.

In a first scheme, after the arrival of the first data, the scheduling-based first communication terminal sends the SR to the communication node. After receiving the SR, the communication node sends the DCI scheduling uplink traffic to the first communication terminal and sends the first indication information and/or the second indication information to the second communication terminal. Before the arrival of the transmission resource of the first communication terminal, the first communication terminal performs the CCA on the target time domain resource reserved by the second communication terminal. After the first communication terminal succeeds in performing the CCA, the first communication terminal and the second communication terminal occupy their respective time-frequency domain resources to send traffic data. After the first communication terminal fails to perform the CCA, the second communication terminal continues to send the data of the second communication terminal after reserving the symbol.

Figure 3A:
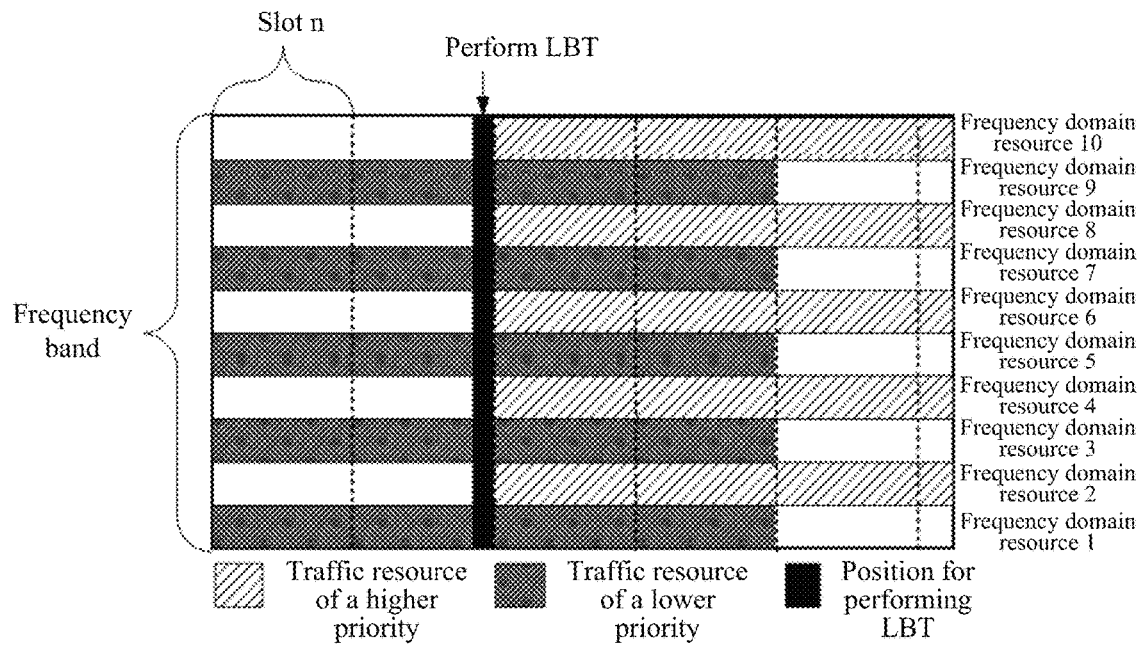
FIG. 3A is a diagram showing time-frequency domain resources for data transmission by a first communication terminal and a second communication terminal in the embodiment of FIG. 2.

FIG. 3A is a diagram showing time-frequency domain resources for data transmission by a first communication terminal and a second communication terminal in the embodiment of FIG. 2. As shown in FIG. 3A, one frequency band is divided into 10 frequency domain resources that are numbered from 1 to 10 respectively. In FIG. 3A, the resources occupied by the second communication terminal are called the traffic resources of a lower priority, and the resources occupied by the first communication terminal are called the traffic resources of a higher priority. The second communication terminal occupies the frequency domain resources 1, 3, 5, 7 and 9 located from slot n to slot n+3 for traffic transmission. Starting from slot n+2, the scheduling-based first communication terminal occupies the frequency domain resources 2, 4, 6, 8 and 10 for data transmission. The second communication terminal reserves the target time domain resource at the end position of the slot n+1. Moreover, the communication node indicates that the third communication terminal whose priority is not higher than a priority of the second communication terminal and whose time-frequency domain resources overlap the time-frequency domain resources of the second communication terminal cannot reserve the time domain resource in slot n+1 for performing LBT. The first communication terminal performs LBT on the reserved target time domain resource, after the LBT is performed successfully, the second communication terminal and the first communication terminal occupy their respective time-frequency domain resources for data transmission.

In a second scheme, after the arrival of the first data, the scheduling-based first communication terminal sends the SR to the communication node. After receiving the SR, the communication node sends the DCI scheduling uplink traffic to the first communication terminal. Before the arrival of the time-frequency domain resources scheduled by the communication node, the first communication terminal conducts the CCA detection in the time domain resource position corresponding to the frequency domain resource position occupied by the first communication terminal. After the CCA is performed successfully, the first communication terminal uses the time-frequency domain resources allocated by the communication node for data transmission, and the second communication terminal uses its corresponding time-frequency domains to send data. In the preceding process, the traffic transmission of the second communication terminal remains uninterrupted.

Figure 3B:
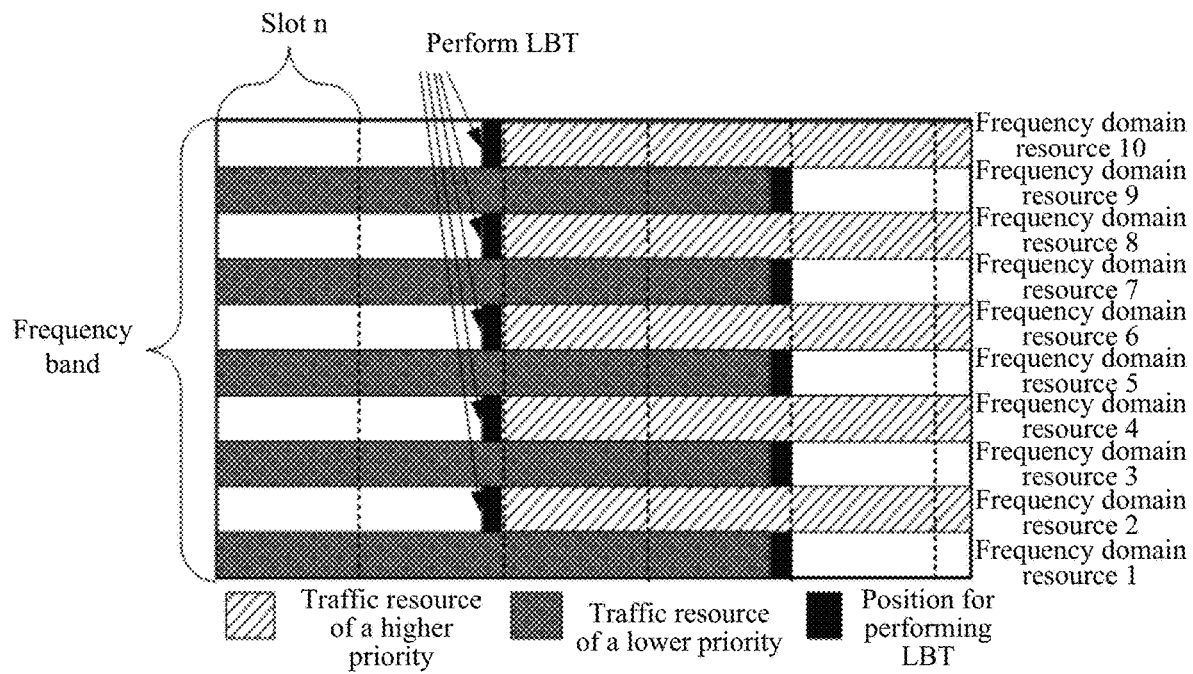
FIG. 3B is a diagram showing another time-frequency domain resources for data transmission by a first communication terminal and a second communication terminal in the embodiment of FIG. 2.

FIG. 3B is a diagram showing another time-frequency domain resources for data transmission by a first communication terminal and a second communication terminal in the embodiment of FIG. 2. As shown in FIG. 3B, one frequency band is divided into 10 frequency domain resources that are numbered from 1 to 10 respectively. The second communication terminal occupies the frequency domain resources 1, 3, 5, 7 and 9 located from slot n to slot n+3 for traffic transmission. Starting from slot n+2, the scheduling-based first communication terminal occupies the frequency domain resources 2, 4, 6, 8 and 10 for data transmission. The first communication terminal performs LBT in at time domain resource positions corresponding to the frequency domain resources 2, 4, 6, 8 and 10 at the end position of the slot n+1. After successfully performing LBT, starting from slot n+2, the first communication terminal occupies the frequency domain resources 2, 4, 6, 8 and 10 for data transmission.

In a fourth implementation, "the time domain resource corresponding to the COT of the first communication terminal overlaps the time domain resource corresponding to the COT of the second communication terminal" in the first transmission multiplexing subcondition and the second transmission multiplexing subcondition may specifically be "the time domain resource corresponding to the COT of the first communication terminal is located inside the time domain resource corresponding to the COT of the second communication terminal and only overlaps the time domain resource corresponding to shared COT of the second communication terminal and/or the corresponding time domain resource after the shared COT of the second communication terminal". In this implementation, after the arrival of the first data, the scheduling-based first communication terminal sends the SR to the communication node. After receiving the SR, the communication node sends the DCI scheduling uplink traffic to the first communication terminal. The communication node may send the first indication information to the second communication terminal. The first indication information is used for indicating that the second communication terminal reserves the target time domain resource for the first communication terminal and is further used for indicating that the second communication terminal limits the range of the shared COT.

It is to be noted that in this implementation, the communication node may only send, to the second communication terminal, any one of the indication information for indicating that the second communication terminal reserves the target time domain resource for the first communication terminal or the indication information for indicating that the second communication terminal limits the range of the shared COT. Alternatively, the communication node sends the indication information for indicating that the second communication terminal reserves the target time domain resource for the first communication terminal to the second communication terminal before sending another indication information for indicating that the second communication terminal limits the range of shared the COT to the second communication terminal.

FIG. 3C is a diagram showing another time-frequency domain resources for data transmission by a first communication terminal and a second communication terminal in the embodiment of FIG. 2. As shown in FIG. 3C, one frequency band is divided into 10 frequency domain resources that are numbered from 1 to 10 respectively. The second communication terminal occupies the frequency domain resources 1, 3, 5, 7 and 9 located from slot n to slot n+4 for traffic transmission. The second communication terminal uses the slot n+3, slot n+4 and the part of resources occupied in the slot n+2 for the shared COT resource. Starting from slot n+4, the scheduling-based first communication terminal occupies the frequency domain resources 2, 4, 6, 8 and 10 for data transmission. After receiving the SR of the first communication terminal, the communication node sends the DCI scheduling the uplink traffic of the first communication terminal and notifies that the second communication terminal limits the shared COT resource. The shared COT resource of the second communication terminal is limited from the occupied slot n+3, slot n+4 and the part of resources occupied in the slot n+2 to the part resources of slot n+2 and part resources of slot n+3. After successfully performing LBT, starting from slot n+4, the first communication terminal occupies the frequency domain resources 2, 4, 6, 8 and 10 for data transmission.

It is to be noted that in the preceding four implementations, the communication node may further send third indication information to the third communication terminal. The third indication information is used for indicating that the third communication terminal cannot perform a CCA on the target time domain resource. The third communication terminal is a communication node whose transmitted data has priority over the second data and whose occupied time-frequency domain resources overlap the time-frequency domain resources corresponding to the COT of the second communication terminal.

In the preceding four implementations, if the first data transmission and/or the second data transmission includes repetitive transmission, that is, multiple transmission of one same transport block (TB), the multiplexing of the first data transmission and the second data transmission may be implemented using one of the following two multiplexing manners.

In manner one, if the first data transmission of the first communication terminal includes repetitive transmission, then the time-frequency domain resources occupied by all the repetitive transmission are regarded as the time-frequency domain resources occupied by the first communication terminal for transmitting the first data, which corresponds to the first transmission multiplexing subcondition and the second transmission multiplexing subcondition, and the time-frequency domain resources corresponding to the COT of the first communication terminal should include the time-frequency domain resources occupied by all the repetitive transmission. Meanwhile, if the second data transmission of the second communication terminal includes repetitive transmission, then the time-frequency domain resources corresponding to the COT of the second communication terminal should also include the time-frequency domain resources occupied by all the repetitive transmission. Based on the preceding definitions, S201 to S202 according to this embodiment are performed to implement the multiplexing of the two traffic data.

In manner two, each repetitive transmission of the first data and/or repetitive transmission of the second data are treated independently, and then the multiplexing of the first data and the second data is dealt based on the preceding four implementations.

In a fifth implementation, the target resource includes a resource corresponding to a reserved frequency band configured for the first data and resources corresponding to nonreserved frequency bands except for the reserved frequency band. In this implementation, the first communication terminal and the second communication terminal do not need to satisfy the transmission multiplexing condition.

In one bandwidth, a frequency domain resource within the bandwidth may be divided into multiple frequency bands. An NR-U device performs LBT in units of frequency bands. After LBT is performed successfully, the corresponding COT may be occupied for transmission data. To satisfy the indicator demands of the traffic of a higher priority, one or more frequency bands may be reserved separately for the traffic of a higher priority, which are only used for transmitting the traffic of a higher priority. The nonreserved frequency bands may simultaneously support the transmission of the traffic of a higher priority and the transmission of the traffic of a lower priority. A reserved frequency band may have more LBT occasions than a nonreserved frequency band.

In this implementation, the first communication terminal performs the clear channel assessment on the resource corresponding to the reserved frequency bands and on the resource corresponding to the nonreserved frequency bands.

When the first communication terminal successfully performs the CCA on the resource corresponding to one kind of the frequency bands, the COT of the frequency bands having the successful CCA is selected for data transmission.

When the channel on the resource corresponding to the reserved frequency bands and the channel on the resource corresponding to the nonreserved frequency bands are determined to be in an idle state, the first communication terminal selects, according to a frequency band selection rule, the channel on the resource corresponding to the target frequency band for transmitting the first data. The frequency band selection rule includes any of the following: A reserved frequency band is determined as the target frequency band; a nonreserved frequency band is determined as the target frequency band; a frequency band having the channel of the best quality among the reserved frequency band and the nonreserved frequency band is determined as the target frequency band; or a combined frequency band of the reserved frequency band and the nonreserved frequency band is determined as the target frequency band. The combined frequency band may only include the reserved frequency band, may only include the nonreserved frequency band, or may simultaneously include both the reserved frequency band and the nonreserved frequency band.

In the data transmission method according to this embodiment, the first communication terminal performs the clear channel assessment on the target resource, where the target resource is the target time domain resource corresponding to the a part of second data transmission suspended or punctured by the second communication terminal, and the first communication terminal and the second communication terminal satisfy the transmission multiplexing condition; and when the channel is determined to be in an idle state, the first communication terminal transmits the first data on the channel. In this manner, in the case where the first communication terminal and the second communication terminal satisfy the transmission multiplexing condition, the transmission multiplexing of the first data of the first communication terminal and the second data of the second communication terminal can be implemented so that utilization of a spectrum resource can be increased.

FIG. 4 is a flowchart of another data transmission method according to one embodiment. This embodiment describes the data transmission method according to this embodiment from the perspective of a second communication terminal. As shown in FIG. 4, the data transmission method according to this embodiment includes the following.

In S401, a second communication terminal suspends or punctures the part of the second data transmission.

A first communication terminal uses a target time domain resource corresponding to the a part of second data transmission suspended or punctured by the second communication terminal as the target resource. The first communication terminal performs a clear channel assessment on the target resource. The first communication terminal and the second communication terminal satisfy a transmission multiplexing condition.

Optionally, the transmission multiplexing condition includes that a time domain resource corresponding to COT of the first communication terminal overlaps a time domain resource corresponding to COT of the second communication terminal.

Further, the transmission multiplexing condition includes that a frequency domain resource corresponding to the COT of the first communication terminal overlaps a frequency domain resource corresponding to the COT of the second communication terminal.

The first communication terminal and the second communication terminal transmit data in the same frequency band. The frequency band is the minimum frequency domain bandwidth unit in which a communication terminal/a communication node perform a clear channel assessment. The COT of the second communication terminal is the acquired COT after the second communication terminal performs the clear channel assessment. The COT of the first communication terminal is the COT pre-occupied by the first communication terminal.

Optionally, first data transmitted by the first communication terminal has priority over second data transmitted by the second communication terminal.

Optionally, before the second communication terminal suspends or punctures the part of the second data transmission, the method according to this embodiment further includes that the second communication terminal receives first indication information sent by a communication node. The first indication information is used for indicating that the second communication terminal suspends or punctures the part of the second data transmission.

Optionally, before the second communication terminal reserves the target time domain resource for the first communication terminal, the method according to this embodiment further includes that the second communication terminal receives second indication information sent by the communication node. The second indication information is used for indicating that the second communication terminal cancels data transmission on a channel on which the first communication terminal transmits the first data.

Optionally, the second communication terminal suspends or punctures the part of the second data transmission according to a time domain resource rule. The time domain resource rule includes that the second communication terminal suspends or punctures the part of the second data transmission before the arrival of a transmission resource of the first communication terminal; or when the first communication terminal needs to transmit data on the transmission resource, the second communication terminal suspends or punctures the part of the second data transmission before the arrival of the transmission resource of the first communication terminal.

Optionally, after S401, the second communication terminal transmits the second data by use of the reduced transmit power on the channel on which the first communication terminal sends the first data.

Optionally, "the time domain resource corresponding to the channel occupancy time (COT) of the first communication terminal overlaps the time domain resource corresponding to the COT of the second communication terminal" in the first transmission multiplexing subcondition and the second transmission multiplexing subcondition may specifically include that the time domain resource corresponding to the COT of the first communication terminal is located inside the time domain resource corresponding to the COT of the second communication terminal and only overlaps the time domain resource corresponding to the shared COT of the second communication terminal and/or the corresponding time domain resource after the shared COT of the second communication terminal. Correspondingly, the first indication information is further used for indicating that the second communication terminal limits the range of the shared COT.

In the data transmission method according to this embodiment, the second communication terminal suspends or punctures the part of the second data transmission, where the first communication terminal uses the target time domain resource corresponding to the a part of second data transmission suspended or punctured by the second communication terminal as the target resource and performs the clear channel assessment on the target resource, and the first communication terminal and the second communication terminal satisfy the transmission multiplexing condition. In this manner, in the case where the first communication terminal and the second communication terminal satisfy the transmission condition, the transmission multiplexing of the first data of the first communication terminal and the second data of the second communication terminal can be implemented so that utilization of a spectrum resource can be increased.

FIG. 5 is a flowchart of another data transmission method according to one embodiment. This embodiment describes the data transmission method according to this embodiment from the perspective of a communication node. As shown in FIG. 5, the data transmission method according to this embodiment includes the following.

In S501, a communication node sends first indication information to a second communication terminal.

The first indication information is used for indicating that the second communication terminal suspends or punctures the part of the second data transmission. A first communication terminal uses a target time domain resource corresponding to the a part of second data transmission suspended or punctured by the second communication terminal as the target resource and performs a clear channel assessment on the target resource. A first communication terminal and the second communication terminal satisfy a transmission multiplexing condition.

Optionally, the transmission multiplexing condition includes that a time domain resource corresponding to COT of the first communication terminal overlaps a time domain resource corresponding to COT of the second communication terminal.

Further, the transmission multiplexing condition includes that a frequency domain resource corresponding to the COT of the first communication terminal overlaps a frequency domain resource corresponding to the COT of the second communication terminal.

The first communication terminal and the second communication terminal transmit data in the same frequency band. The frequency band is the minimum frequency domain bandwidth unit in which a communication terminal/a communication node perform a clear channel assessment. The COT of the second communication terminal is the acquired COT after the second communication terminal performs the clear channel assessment. The COT of the first communication terminal is the COT pre-occupied by the first communication terminal.

Optionally, first data transmitted by the first communication terminal has priority over second data transmitted by the second communication terminal.

Optionally, the data transmission method according to this embodiment further includes that a communication node sends second indication information to the second communication terminal. The second indication information is used for indicating that the second communication terminal cancels data transmission on a channel on which the first communication terminal transmits the first data.

Optionally, the data transmission method according to this embodiment further includes that the communication node sends third indication information to a third communication terminal. The third indication information is used for indicating that the third communication terminal cannot perform a clear channel assessment on the target time domain resource. The third communication terminal is a communication terminal whose transmitted data has a priority not higher than a priority of the second data and whose occupied time-frequency domain resources overlap time-frequency domain resources corresponding to the COT of the second communication terminal.

In the data transmission method according to this embodiment, the communication node sends the first indication information to the second communication terminal, wherein the first indication information is used for indicating that the second communication terminal suspends or punctures the part of the second data transmission, the first communication terminal uses the target time domain resource corresponding to the a part of second data transmission suspended or punctured by the second communication terminal as the target resource and performs the clear channel assessment on the target resource, and the first communication terminal and the second communication terminal satisfy the transmission multiplexing condition. In this manner, in the condition that the first communication terminal and the second communication terminal satisfy the transmission multiplexing condition, the transmission multiplexing of the first data of the first communication terminal and the second data of the second communication terminal can be implemented so that utilization of a spectrum resource can be increased.

Figure 6:
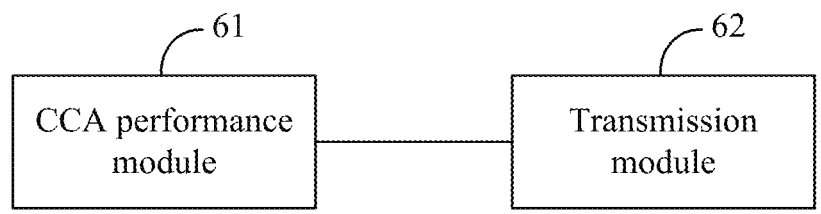
FIG. 6 is a diagram illustrating the structure of a first communication terminal according to one embodiment.

FIG. 6 is a diagram illustrating the structure of a first communication terminal according to one embodiment. As shown in FIG. 6, the first communication terminal according to this embodiment includes the following modules: a CCA performance module 61 and a transmission module 62.

The CCA performance module 61 is configured to perform a clear channel assessment on a target resource.

The target resource is a target time domain resource corresponding to a part of second data transmission suspended or punctured by the second communication terminal. The first communication terminal and the second communication terminal satisfy a transmission multiplexing condition.

The transmission module 62 is configured to transmit first data on a channel when the channel is determined to be in an idle state.

Optionally, the transmission multiplexing condition includes that a time domain resource corresponding to COT of the first communication terminal overlaps a time domain resource corresponding to COT of the second communication terminal.

Further, the transmission multiplexing condition includes that a frequency domain resource corresponding to the COT of the first communication terminal overlaps a frequency domain resource corresponding to the COT of the second communication terminal.

Optionally, the first data transmitted by the first communication terminal has priority over second data transmitted by the second communication terminal.

Optionally, a third communication terminal cannot perform a clear channel assessment on the target time domain resource. The third communication terminal is a communication terminal whose transmitted data has a priority not higher than a priority of the second data and whose occupied time-frequency domain resources overlap time-frequency domain resources corresponding to the COT of the second communication terminal.

Optionally, the target resource is the target time domain resource corresponding to the a part of second data transmission suspended or punctured by the second communication terminal according to a time domain resource rule. The time domain resource rule includes that the second communication terminal suspends or punctures the part of the second data transmission before the arrival of a transmission resource of the first communication terminal; or when the first communication terminal needs to transmit data on the transmission resource, the second communication terminal suspends or punctures the part of the second data transmission before the arrival of the transmission resource of the first communication terminal.

Optionally, the transmission module 62 is specifically configured to transmit the first data on the channel by use of the enhanced transmit power.

Optionally, that the time domain resource corresponding to the channel occupancy time (COT) of the first communication terminal overlaps the time domain resource corresponding to the COT of the second communication terminal includes that the time domain resource corresponding to the COT of the first communication terminal is located inside the time domain resource corresponding to the COT of the second communication terminal and only overlaps a time domain resource corresponding to shared COT of the second communication terminal and/or a corresponding time domain resource after the shared COT of the second communication terminal.

The first communication terminal according to this embodiment is used for implementing the data transmission method in the embodiment shown in FIG. 2 and has similar implementation principles and technical effects, which are not be repeated here.

Figure 7:
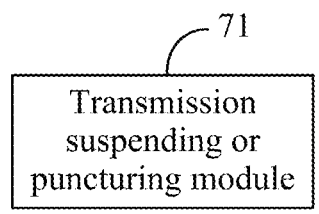
FIG. 7 is a diagram illustrating the structure of a second communication terminal according to one embodiment.

FIG. 7 is a diagram illustrating the structure of a second communication terminal according to one embodiment. As shown in FIG. 7, the second communication terminal according to this embodiment includes a transmission suspending or puncturing module 71.

The transmission suspending or puncturing module 71 is configured to suspend or puncture a part of the second data transmission.

A first communication terminal uses a target time domain resource corresponding to the a part of second data transmission suspended or punctured by the second communication terminal as the target resource and performs a clear channel assessment on the target resource. The first communication terminal and the second communication terminal satisfy a transmission multiplexing condition.

Optionally, the transmission multiplexing condition includes that a time domain resource corresponding to COT of the first communication terminal overlaps a time domain resource corresponding to COT of the second communication terminal.

Further, the transmission multiplexing condition includes that a frequency domain resource corresponding to the COT of the first communication terminal overlaps a frequency domain resource corresponding to the COT of the second communication terminal.

Optionally, first data transmitted by the first communication terminal has priority over second data transmitted by the second communication terminal.

Optionally, a third communication terminal cannot perform a clear channel assessment on the target time domain resource. The third communication terminal is a communication terminal whose transmitted data has priority over the second data and whose occupied time-frequency domain resources overlap time-frequency domain resources corresponding to the COT of the second communication terminal.

Optionally, the second communication terminal further includes a first receiving module. The first receiving module is configured to receive first indication information sent by a communication node. The first indication information is used for indicating that the second communication terminal suspends or punctures the part of the second data transmission.

Optionally, the second communication terminal further includes a second receiving module. The second receiving module is configured to receive second indication information sent by the communication node. The second indication information is used for indicating that the second communication terminal cancels data transmission on a channel on which the first communication terminal transmits the first data.

Optionally, the transmission suspending or puncturing module 71 is specially configured to suspend or puncture the part of the second data transmission according to a time domain resource rule. The time domain resource rule includes that the second communication terminal suspends or punctures the part of the second data transmission before the arrival of the transmission resource of the first communication terminal; or when the first communication terminal needs to transmit data on the transmission resource, the second communication terminal suspends or punctures the part of the second data transmission before the arrival of the transmission resource of the first communication terminal.

Optionally, the second communication terminal further includes a transmit module. The transmit module is configured to transmit the second data by use of the reduced transmit power on the channel on which the first communication terminal sends the first data.

Optionally, that the time domain resource corresponding to the channel occupancy time (COT) of the first communication terminal overlaps the time domain resource corresponding to the COT of the second communication terminal includes that the time domain resource corresponding to the COT of the first communication terminal is located inside the time domain resource corresponding to the COT of the second communication terminal and overlaps a time domain resource corresponding to shared COT of the second communication terminal and/or a corresponding time domain resource after the shared COT of the second communication terminal. Correspondingly, the first indication information is further used for indicating that the second communication terminal limits the range of the shared COT.

The second communication terminal according to this embodiment is used for implementing the data transmission method in the embodiment shown in FIG. 4 and has similar implementation principles and technical effects, which are not repeated here.

Figure 8:
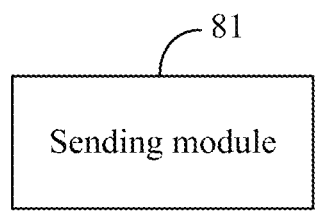
FIG. 8 is a diagram illustrating the structure of a communication node according to one embodiment.

FIG. 8 is a diagram illustrating the structure of a communication node according to one embodiment. As shown in FIG. 8, the communication node according to this embodiment includes a sending module 81.

The sending module 81 is configured to send first indication information to a second communication terminal.

The first indication information is used for indicating that the second communication terminal suspends or punctures the part of the second data transmission. A first communication terminal uses a target time domain resource corresponding to the a part of second data transmission suspended or punctured by the second communication terminal as the target resource and performs a clear channel assessment on the target resource. A first communication terminal and the second communication terminal satisfy a transmission multiplexing condition.

Optionally, the transmission multiplexing condition includes that a time domain resource corresponding to COT of the first communication terminal overlaps a time domain resource corresponding to COT of the second communication terminal.

Further, the transmission multiplexing condition includes that a frequency domain resource corresponding to the COT of the first communication terminal overlaps a frequency domain resource corresponding to the COT of the second communication terminal.

Optionally, first data transmitted by the first communication terminal has priority over second data transmitted by the second communication terminal.

Optionally, a third communication terminal cannot perform a clear channel assessment on the target time domain resource. The third communication terminal is a communication terminal whose transmitted data has a priority not higher than a priority of the second data and whose occupied time-frequency domain resources overlap time-frequency domain resources corresponding to the COT of the second communication terminal.

Optionally, the sending module 81 is further configured to send second indication information to the second communication terminal. The second indication information is used for indicating that the second communication terminal cancels data transmission on a channel on which the first communication terminal transmits the first data.

Optionally, the sending module 81 is further configured to send third indication information to the third communication terminal. The third indication information is used for indicating that the third communication terminal cannot perform the clear channel assessment on the target time domain resource. The third communication terminal is the communication terminal whose transmitted data has a priority not higher than a priority of the second data and whose occupied time-frequency domain resources overlap the time-frequency domain resources corresponding to the COT of the second communication terminal.

The communication node according to this embodiment is used for implementing the data transmission method in the embodiment shown in FIG. 5 and has similar implementation principles and technical effects, which are not repeated here.

Figure 9:
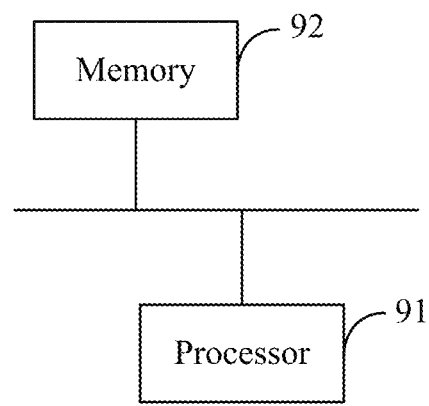
FIG. 9 is a diagram illustrating the structure of a data transmission apparatus according to one embodiment.

FIG. 9 is a diagram illustrating the structure of a data transmission apparatus according to one embodiment. As shown in FIG. 9, the data transmission apparatus includes a processor 91. Optionally, a memory 92 may be further included. The data transmission apparatus may include one or more processors 91. One processor 91 is used as an example in FIG. 9. The processor 91 and the memory 92 in the data transmission apparatus may be connected via a bus or in nonreserved manners. The connection via the bus is used as an example in FIG. 9.

As a computer-readable storage medium, the memory 92 may be configured to store software programs, computer-executable programs and modules, such as program instructions/modules corresponding to the data transmission method in the embodiments of the present application (for example, the CCA performance module 61 and the transmission module 62 in the first communication terminal, or the transmission suspending or puncturing module 71 in the second communication terminal or the sending module 81 in the communication node). The processor 91 runs the software programs, the instructions and the modules that are stored in the memory 92 to perform various function applications and data processing in the data transmission apparatus, that is, to implement the preceding data transmission method.

The memory 92 may mainly include a program storage region and a data storage region. The program storage region may store an operating system and an application program required by at least one function. The data storage region may store data created according to the use of the data transmission apparatus. In addition, the memory 92 may include a high-speed random access memory and a nonvolatile memory, such as at least one disk memory, a flash memory or a nonreserved nonvolatile solid-state memory.

Embodiments of the present application further provide a storage medium including a computer-executable instruction. When executed by a processor of a computer, the computer-executable instruction is used for causing the processor to perform the data transmission method according to any one of the embodiments of the present application.

The preceding are only example embodiments of the present application and are not intended to limit the scope of the present application.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor or other computing apparatuses, though the present application is not limited thereto.

Embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, state setting data or source codes or object codes written in any combination of one or more programming languages.

A block diagram showing any logic flow among the drawings of the present application may represent program steps, may represent interconnected logic circuits, modules and functions, or may represent a combination of program steps with logic circuits, modules and functions. Computer programs may be stored in a memory. The memory may be of any type appropriate for the local technical environment and may be implemented by using any appropriate data storage technology, such as, but not limited to, a read-only memory (ROM), a random access memory (RAM), an optical storage apparatus and system (a digital video disc (DVD) or a compact disk (CD)) and the like. Computer-readable media may include non-transitory storage media. The data processor may be of any type appropriate for the local technical environment, such as, but not limited to, a general purpose computer, a special purpose computer, a microprocessor, a digital signal processor (DSP), an application-specific integrated circuit (ASIC), a field-program-

What is claimed is:

1. A data transmission method, comprising:
performing, by a first communication terminal, a clear channel assessment on a target resource, wherein the target resource is a target time domain resource corresponding to a part of second data transmission suspended or punctured by a second communication terminal, and the first communication terminal and the second communication terminal satisfy a transmission multiplexing condition; and
in response to determining that a channel is in an idle state, transmitting, by the first communication terminal, first data on the channel;
wherein the transmission multiplexing condition comprises the following:
a time domain resource corresponding to channel occupancy time (COT) of the first communication terminal overlaps a time domain resource corresponding to COT of the second communication terminal; or
wherein the transmission multiplexing condition further comprises the following:
a frequency domain resource corresponding to the COT of the first communication terminal overlaps a frequency domain resource corresponding to the COT of the second communication terminal;
wherein the first communication terminal and the second communication terminal are mobile terminals different from a base station, the COT of the first communication terminal is an occupied COT resource when the first communication terminal uses a scheduling-based resource or a scheduling-free resource for transmission, and the COT of the second communication terminal is an acquired COT after the second communication terminal performs the clear channel assessment.

2. The method according to claim 1, wherein the first data transmitted by the first communication terminal has priority over second data transmitted by the second communication terminal.

3. The method according to claim 1, wherein the target resource is the target time domain resource corresponding to the part of second data transmission suspended or punctured by the second communication terminal according to a time domain resource rule; and
wherein the time domain resource rule comprises the following: the second communication terminal suspends or punctures the part of the second data transmission before arrival of a transmission resource of the first communication terminal; or when the first communication terminal needs to transmit data on the transmission resource, the second communication terminal suspends or punctures the part of the second data transmission before the arrival of the transmission resource of the first communication terminal.

4. The method according to claim 3, wherein the transmitting, by the first communication terminal, the first data on the channel comprises:
transmitting, by the first communication terminal, the first data on the channel by use of an enhanced transmit power.

5. A data transmission method, comprising:
suspending or puncturing, by a second communication terminal, a part of second data transmission, wherein a first communication terminal uses a target time domain resource corresponding to the part of second data transmission suspended or punctured by the second communication terminal as a target resource and performs a clear channel assessment on the target resource, and the first communication terminal and the second communication terminal satisfy a transmission multiplexing condition;
wherein the transmission multiplexing condition comprises the following: a time domain resource corresponding to channel occupancy time (COT) of the first communication terminal overlaps a time domain resource corresponding to COT of the second communication terminal; or
wherein the transmission multiplexing condition further comprises the following:
a frequency domain resource corresponding to the COT of the first communication terminal overlaps a frequency domain resource corresponding to the COT of the second communication terminal;
wherein the first communication terminal and the second communication terminal are mobile terminals different from a base station, the COT of the first communication terminal is an occupied COT resource when the first communication terminal uses a scheduling-based resource or a scheduling-free resource for transmission, and the COT of the second communication terminal is an acquired COT after the second communication terminal performs the clear channel assessment.

6. The method according to claim 5, wherein first data transmitted by the first communication terminal has priority over second data transmitted by the second communication terminal.

7. The method according to claim 5, before the suspending or puncturing, by the second communication terminal, the part of the second data transmission, the method further comprising:
receiving, by the second communication terminal, first indication information sent by a communication node, wherein the first indication information is used for indicating that the second communication terminal suspends or punctures the part of the second data transmission.

8. The method according to claim 5, before the suspending or puncturing, by the second communication terminal, the part of the second data transmission, the method further comprising:
receiving, by the second communication terminal, second indication information sent by a communication node, wherein the second indication information is used for indicating that the second communication terminal cancels data transmission on a channel on which the first communication terminal transmits first data.

9. The method according to claim 5, wherein the suspending or puncturing, by the second communication terminal, the part of the second data transmission comprises:
suspending or puncturing, by the second communication terminal, the part of the second data transmission according to a time domain resource rule, wherein
the time domain resource rule comprises the following:
the second communication terminal suspends or punctures the part of the second data transmission before arrival of a transmission resource of the first communication terminal; or when the first communication terminal needs to transmit data on the transmission resource, the second communication terminal suspends or punctures the part of the second data transmission before the arrival of the transmission resource of the first communication terminal.

10. The method according to claim 9, after the suspending or puncturing, by the second communication terminal, the part of the second data transmission, the method further comprising:

transmitting, by the second communication terminal, second data by use of a reduced transmit power on a channel on which the first communication terminal transmits first data.

11. A data transmission method, comprising:

sending, by a communication node, first indication information to a second communication terminal, wherein the first indication information is used for indicating that the second communication terminal suspends or punctures a part of second data transmission;

wherein a first communication terminal uses a target time domain resource corresponding to the part of second data transmission suspended or punctured by the second communication terminal as a target resource and performs a clear channel assessment on the target resource; and the first communication terminal and the second communication terminal satisfy a transmission multiplexing condition;

wherein the transmission multiplexing condition comprises the following: a time domain resource corresponding to channel occupancy time (COT) of the first communication terminal overlaps a time domain resource corresponding to COT of the second communication terminal;

wherein the first communication terminal and the second communication terminal are mobile terminals different from a base station, and the communication node is the base station, the COT of the first communication terminal is an occupied COT resource when the first communication terminal uses a scheduling-based resource or a scheduling-free resource for transmission, and the COT of the second communication terminal is an acquired COT after the second communication terminal performs the clear channel assessment.

12. The method according to claim 11, wherein the transmission multiplexing condition further comprises the following:

a frequency domain resource corresponding to the COT of the first communication terminal overlaps a frequency domain resource corresponding to the COT of the second communication terminal.

13. The method according to claim 11, wherein first data transmitted by the first communication terminal has priority over second data transmitted by the second communication terminal.

14. The method according to claim 11, further comprising:

sending, by the communication node, second indication information to the second communication terminal, wherein the second indication information is used for indicating that the second communication terminal cancels data transmission on a channel on which the first communication terminal transmits first data.

15. A data transmission apparatus, comprising: at least one processor;

a memory, which is configured to store programs executable by the at least one processor; wherein the at least one processor is configured to execute the programs, when executed, perform the method of claim 1.

16. A non-transitory computer-readable storage medium, the computer-readable storage medium storing a computer program which, when executed by a processor, causes the processor to implement the data transmission method according to claim 1.

* * * * *